US012585592B2

(12) United States Patent
Chofleming et al.

(10) Patent No.: US 12,585,592 B2
(45) Date of Patent: Mar. 24, 2026

(54) TAG SIZE REDUCTION USING MULTIPLE HASH FUNCTIONS

(71) Applicant: Intel Corporation, Santa Clara, CA (US)

(72) Inventors: Kermin Chofleming, Hudson, MA (US); Yu Bai, Shrewsbury, MA (US)

(73) Assignee: Intel Corporation, Santa Clara, CA (US)

( * ) Notice: Subject to any disclaimer, the term of this patent is extended or adjusted under 35 U.S.C. 154(b) by 791 days.

(21) Appl. No.: 17/751,049

(22) Filed: May 23, 2022

(65) Prior Publication Data

US 2022/0283948 A1      Sep. 8, 2022

(51) Int. Cl.
| | |
|---|---|
| *G06F 12/08* | (2016.01) |
| *G06F 12/0864* | (2016.01) |
| *G06F 12/0891* | (2016.01) |
| *G06F 12/12* | (2016.01) |
| *G06F 12/126* | (2016.01) |

(52) U.S. Cl.
CPC ...... *G06F 12/0864* (2013.01); *G06F 12/0891* (2013.01); *G06F 12/126* (2013.01); *G06F 2212/1021* (2013.01)

(58) Field of Classification Search
CPC ............. G06F 12/0864; G06F 12/0891; G06F 12/126; G06F 2212/1021; Y02D 10/00
See application file for complete search history.

(56) References Cited

U.S. PATENT DOCUMENTS

| | | | |
|---|---|---|---|
| 10,942,848 | B2 | 3/2021 | Lee |
| 2017/0255562 | A1* | 9/2017 | Usui ................... G06F 12/0886 |
| 2018/0336263 | A1* | 11/2018 | Bensberg .............. G06F 16/284 |
| 2019/0102314 | A1* | 4/2019 | Wang .................. H04W 52/246 |
| 2021/0334037 | A1 | 10/2021 | Youn et al. |
| 2022/0075730 | A1* | 3/2022 | Guirado .............. G06F 12/0875 |
| 2022/0091992 | A1 | 3/2022 | Shanbhogue et al. |
| 2022/0365881 | A1* | 11/2022 | Granovsky ......... G06F 12/0891 |
| 2022/0405209 | A1 | 12/2022 | ChoFleming et al. |

* cited by examiner

*Primary Examiner* — Masud K Khan
(74) *Attorney, Agent, or Firm* — Compass IP Law PC

(57) ABSTRACT

An example of a system using two-stage, the cache tag is stored in a primary and a secondary tag memories. When requesting data, the system searches the cache to retrieve the data, an operation that involves cache tag lookup. Cache tag lookup is performed by cache management. The cache management receives a cache tag for reading data from the cache memory. The cache management selects a hash function from a group of hash functions and computes a primary lookup tag using the selected hash function and the cache tag. The cache management compares the primary lookup tag to the contents of the primary tag memory to determine if there is a hit. If there is no hit, the cache management selects another hash function and repeats the search in the primary tag memory.

18 Claims, 6 Drawing Sheets

Cache Write Pipeline 200

Memory Address 205

Cache Tag 210

Hash Function 1 215-1     Hash Function 2 215-2     •••     Hash Function N 215-N Primary Lookup Tag 1 220-1     Primary Lookup Tag 2 220-2     •••     Primary Lookup Tag N 220-N Primary Match Count 1 225-1     Primary Match Count 2 225-2     •••     Primary Match Count N 225-N Selection 230

Hash Index 235     Primary Tag 240

Hash Index Memory 245     Primary Tag Memory 250

Serial Flow 300

Parallel Flow 350

Line Oriented Hash Selection 400

| Hash Index 1 410-1 | Cache Line 1 405-1 |
| Hash Index 2 410-2 | Cache Line 2 405-2 |
| ⋮ | ⋮ |
| Hash Index A 410-A | Cache Line A 405-A |

Set Oriented Hash Selection 450

Set 1 455-1

| | Cache Line 1 460-1 |
| Hash Index 1 465-1 | Cache Line 2 460-2 |
| | ⋮ |
| | Cache Line B 460-B |

⋮

Set K 455-K

| | Cache Line 1 480-1 |
| Hash Index K 465-K | Cache Line 2 480-2 |
| | ⋮ |
| | Cache Line B 480-B |

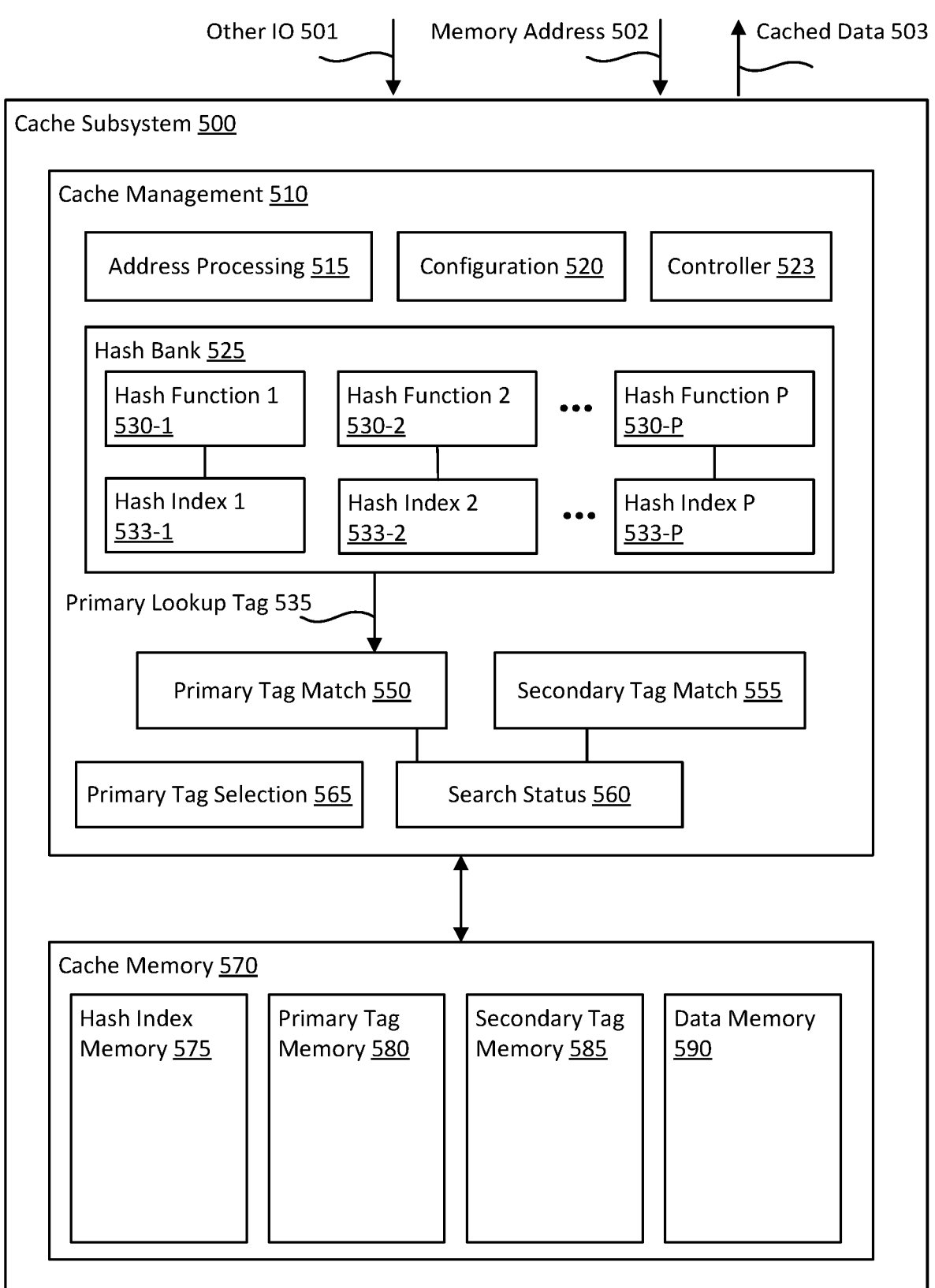

Other IO 501    Memory Address 502    Cached Data 503

Cache Subsystem 500

Cache Management 510

Address Processing 515    Configuration 520    Controller 523

Hash Bank 525

Hash Function 1 530-1    Hash Function 2 530-2    ...    Hash Function P 530-P

Hash Index 1 533-1    Hash Index 2 533-2    ...    Hash Index P 533-P

Primary Lookup Tag 535

Primary Tag Match 550    Secondary Tag Match 555

Primary Tag Selection 565    Search Status 560

Cache Memory 570

Hash Index Memory 575    Primary Tag Memory 580    Secondary Tag Memory 585    Data Memory 590

Figure 5

TAG SIZE REDUCTION USING MULTIPLE HASH FUNCTIONS

FIELD

Descriptions are generally related to cache technology, and more particularly, descriptions are related to cache tag technology.

BACKGROUND

Memory or storage caching refers to technology in which data is temporarily stored in some location that enables faster access to that data. For example, static random access memory (SRAM) provides faster access than dynamic random access memory (DRAM), which provides faster access than system storage (e.g., a solid-state drive (SDD)). A portion of memory available to a system may be designated as cache memory. A cache block (or cache line) refers to a unit for cache storage, and a cache row (or cache set) refers to a number of blocks or lines as determined by the layout of the cache (e.g., direct-mapped, set-associative, fully associative, etc.). A cache tag refers to an identifier for data stored in the cache, generally derived from a memory address. Because different regions of memory may be mapped into a cache line, the tag is utilized to differentiate between them. A valid bit is utilized in some implementations to indicate whether the data in a cache line is valid. For access to a particular memory address, a tag is generated from the address and compared to tags associated with cache lines stored in the cache. If there is no match, the access is considered to 'miss' the cache. If there is a match and valid data is present in the cache that corresponds to the address, the access is considered to 'hit' the cache.

Recent advances in manufacturing technology have enabled the construction of large caches using tightly integrated DRAM. The size of these caches could be multiple gigabytes in some process technologies. In typical caches, tags are used to store metadata, such as whole or parts of the memory address, to enable the retrieval of stored values. The metadata can amount to 10-15% of the cache capacity in terms of bits stored (e.g., tens of megabytes or more).

Because the purpose of caches is to reduce latency and because tag checks are on the critical path, it is valuable to store tags in faster memory (e.g., static random access memory (SRAM)). Unfortunately, the size of SRAM tags needed to cover a multiple gigabyte cache is prohibitively expensive in terms of both physical silicon cost of the tags and power consumption due to leakage on such a large array, which can amount to many watts. Many conventional techniques to address tag size problems for large caches relate to tag compression techniques. For example, a common technique is a sector cache, in which contiguous large blocks of data are represented by a single tag, with single bits representing the validity of cache-line-sized subblocks. In entropy-reduction techniques, numerical patterns across cache tags are used to reduce the number of bits that need to be stored. Some systems deploy basic sector caches, others deploy more advanced sector caches, such as those involving pointers. Using pointers removes the need for physical data contiguity but requires more area to implement.

BRIEF DESCRIPTION OF THE DRAWINGS

The following description includes discussion of figures having illustrations given by way of example of an implementation. The drawings should be understood by way of example, and not by way of limitation. As used herein, references to one or more examples are to be understood as describing a particular feature, structure, or characteristic included in at least one implementation of the invention. Phrases such as "in one example" or "in an alternative example" appearing herein provide examples of implementations of the invention and do not necessarily all refer to the same implementation. However, they are also not necessarily mutually exclusive.

FIG. 5 is a block diagram of an example of a cache subsystem.

Figure 1:
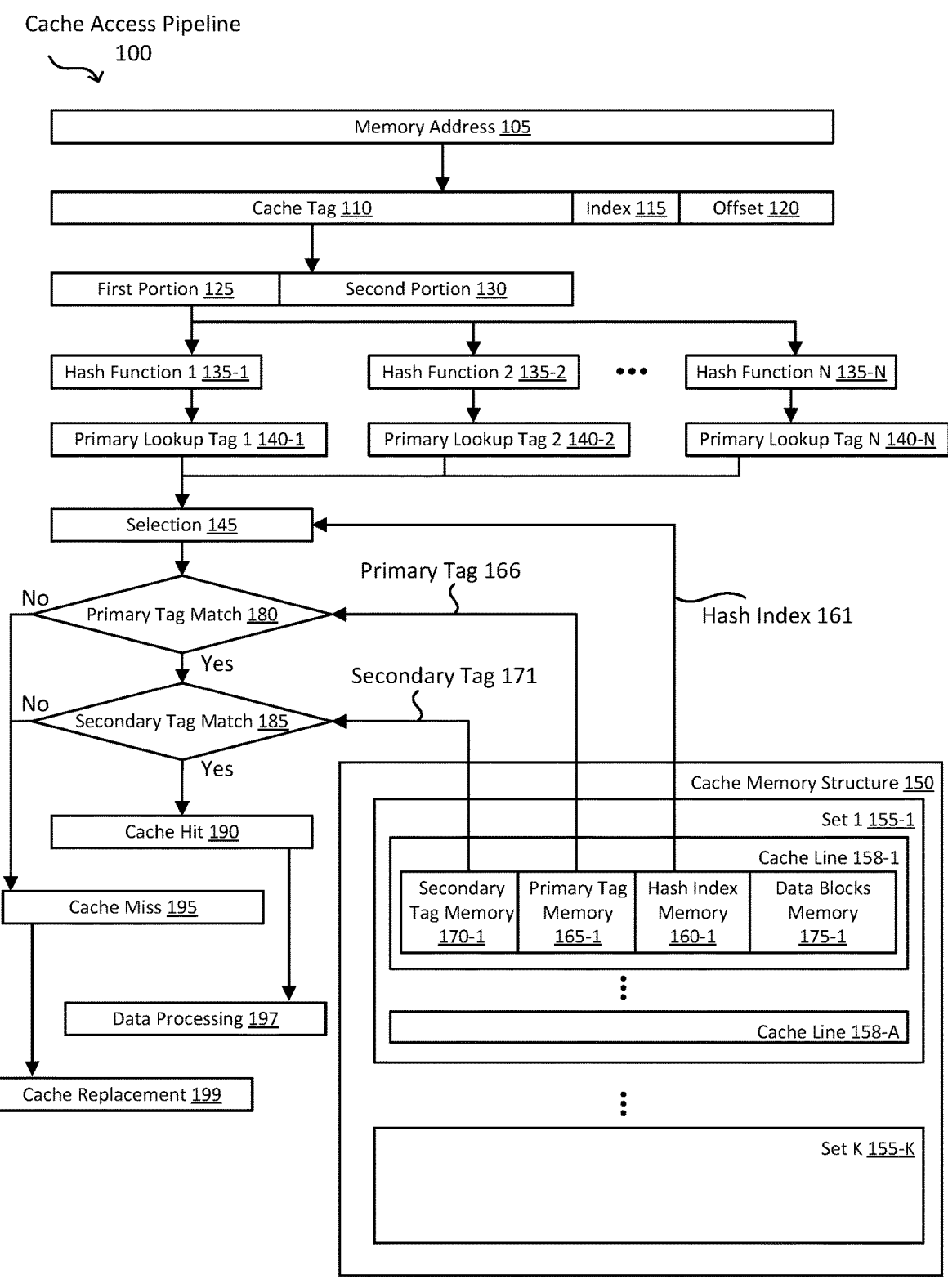
FIG. 1 is a flow diagram of an example of a cache access pipeline.

Descriptions of certain details and implementations follow, including non-limiting descriptions of the figures, which may depict some or all examples, as well as other potential implementations.

DETAILED DESCRIPTION

As described herein, a system with multi-step cache tag storage can store and lookup primary tags using multiple hash functions. When requesting data, the system searches the cache to retrieve the data, an operation that involves cache tag lookup. Cache tag lookup is performed by cache management. The cache management receives a cache tag for reading data from the cache memory. The cache management selects a hash function from a group of hash functions and computes a primary lookup tag using the selected hash function and the cache tag. The cache management compares the primary lookup tag to the contents of the primary tag memory to determine if there is a hit.

In an example system with a hierarchical or two-step tag lookup scheme, part of the cache tags are stored in one memory device/structure, such as SRAM, and part of the cache tags are stored in another memory device/structure, such as dynamic random access memory (DRAM). In such an implementation, tag and metadata bits stored in SRAM are the primary tags, and the SRAM can be referred to as the primary tag memory. The tag and metadata bits stored in the DRAM are the secondary tags, and the DRAM can be referred to as the secondary tag memory. The combination of the primary and secondary tag is equivalent to a tag in a conventional cache, and no additional data is needed to be stored. The more bits stored in DRAM, the more efficient the cache will be in terms of area and leakage.

In an example, when the system needs data from memory, it first checks whether the data is available in the cache, an operation referred to as a cache check. The system requesting data provides the memory address of the data to the cache management. The cache management in the first stage checks the memory device/structure for the primary tag that matches the primary tag of the data address. In an example embodiment, a partial, probabilistic tag match is performed on SRAM during the first stage. With high probability, this check identifies whether the tag is cached. In the second stage, the cache management checks secondary tags stored in DRAM for a secondary tag made from the data address. If a match is found, a final check is performed to confirm that data associated with the matched primary and secondary tags is available in the cache. The two-step tag lookup allows most of the cache tag storage to be implemented in DRAM, which is energy and area efficient relative to SRAM while retaining performance characteristics comparable to an SRAM-only tag implementation.

Unlike conventional tag stores, the primary tag store contains only a portion of the tag bits of the address. As the primary tag store is smaller than the conventional tag store, it requires less energy for comparison as fewer bits are read from SRAM. If a comparison with the primary tag store indicates one or more matches, it is very likely that the target address is in the cache, and access proceeds to the second stage of tag check, i.e., secondary tag match. The secondary tag match can occur in parallel with data access. Reducing the number of bits in this stage will minimize the overall cost of access but may incur penalties due to 'misprediction.' Misprediction happens when the primary tag indicates that data is in the cache, but the data is not there. In one example, the cache subsystem uses a hash function to calculate the primary tags, as randomization reduces the number of collisions or mispredictions. Using more hash functions to calculate the primary tags reduces the misprediction rates for access to a two-stage cache and requires storing fewer bits than a single hash function implementation with a similar misprediction rate. Choosing a hash function that minimizes the number of collisions in the primary tag store contributes to reducing the cache hit misprediction.

FIG. 1 is a flow diagram of an example of a cache access pipeline 100. The cache subsystem includes cache management and cache memory. In one example, every hash function 135-1 to 135 N, collectively referred to as hash functions 135, receives memory address 105, and each computes one of primary lookup tags 140-1 to 140-N, collectively referred to as primary lookup tags 140. The cache management selects one of the cache lines 158. Based on the hash index stored with the primary tags in the selected cache line, selection 145 selects one of primary lookup tags 140. Primary tag match 180 compares the selected primary lookup tag with the primary tag stored in primary tag memory 165 of the selected cache line. If matches are found, secondary tag match 185 compares the second portion 130 to the secondary tag stored in the secondary tag memory 170 of the selected cache line. Hash functions 135 can also be inverted, e.g., when an error correction flow occurs. Inverting XOR-based hashes can be done with simple logic operations.

In one example, the cache management performs tag generation and tag check, and cache memory stores tags, data, and other information (metadata). Cache memory structure 150 is an example of the structure and architecture of cache memory. In one example, cache memory structure 150 is divided into sets, such as set 1 155-1, . . . , set K 155-K, collectively referred to as sets 155. The cache memory structure 150 in FIG. 1 has K sets. Each addressable memory unit in memory is associated with a set 155. The number of memory addresses associated with one of sets 155 is more than the size of the data that can be stored in that set. Furthermore, a given set in sets 155 includes multiple cache lines, e.g., cache line 158-1, . . . , cache line 158-A, collectively referred to as cache line 158. The other K−1 sets 155 will have corresponding elements. A given cache line 158 includes primary tag memory 165, secondary tag memory 170, hash index memory 160, and data blocks memory 175. For example, FIG. 1 specifically illustrates secondary tag memory 170-1, primary tag memory 165-1, hash index memory 160-1, and data blocks memory 175-1 of cache line 158-1. Other A−1 cache lines 158 will have corresponding elements.

In one example, data blocks memory 175 in a cache line 158 stores multiple addressable memory units. The information stored in one cache line 158 is associated with one memory address. For example, the entries in cache line 158-1, i.e., the hash index stored in hash index memory 160-1, the primary tag stored in primary tag memory 165-1, the secondary tag stored in secondary tag memory 160-1, and data stored in data blocks memory 175-1 are all associated with the same memory address.

Cache memory structure 150 can be implemented in several ways. In one example, primary tag memory 165 is on a static random access memory (SRAM). In one example, secondary tag memory 170 is on a DRAM. In another example, hash index memory 160 is colocated with the primary tag memory 165. The association of data blocks memory 175, hash index memory 160, primary tag memory 165, and secondary tag memory 170 to cache line 158 is a logical association with various physical implementations. Similarly, the association of cache line 158 to set 155 and set 155 to cache memory structure 150 are logical associations with different physical implementations.

In one example, cache management receives memory address 105. The cache subsystem has to check whether the data associated with memory address 105 is available in the cache. In one example, memory address 105 includes: cache tag 110, index 115, and offset 120. In one example, index 115 identifies the association between memory address 105 and one of the sets in set 155. If the cache management identified the cache line 158 in which the requested data is stored, then the offset 120 determines which data in data blocks memory 175 is the desired data.

In one example, the cache management divides cache tag 110 into first portion 125 and second portion 130. In one example, first portion 125 has fewer bits than cache tag 110 and second portion 130. There are N hash functions; hash function 1 135-1, hash function 2 135-2, . . . , hash function N 135-N, collectively referred to as hash functions 135. Hash functions 135 take first portion 125 as input and compute primary lookup tag 1 140-1, primary lookup tag 2 140-2, . . . , primary lookup tag N 140-N, collectively referred to as primary lookup tags 140.

In one example, each primary tag stored in primary tag memory 165 is associated with a hash index in hash index memory 160. In one example, the hash index takes values between 1 and N and is used to index hash functions 135. For example, a hash index with value 1 is an index directed to hash function 1 135-1. Each hash function 135 is also associated with a hash index. For example, a hash index with a value equal to '1' is associated with hash function 1 135-1, or a hash index with a value equal to '2' is associated with hash function 2 135-2.

To check whether the data is stored in the cache, in one example, the cache management selects one of cache lines 158 and compares the primary tag 166 and secondary tag 171 stored in that cache line with the primary lookup and secondary lookup tags made from cache tag 110. In the first step, primary tag match 180, the cache management compares the primary lookup tags against the contents of primary tag memory 165. Selection 145 receives hash index 161 of the selected cache line and selects a primary lookup tag 140 generated by the hash function 135 associated with the hash index 161. The cache management compares the selected primary lookup tag and primary tag 166. If the selected primary lookup tag and primary tag 166 do not match, it is a tag miss indicating that it is not possible that the selected cache line contains the data associated with memory address 105 and the cache management triggers cache miss 195. The cache management repeats the process by comparing the primary tag stored in the primary tag memory 165 of another cache line 158. In one example, when all primary tags in primary tag memory 165 are compared against primary lookup tags 140 without any match, the cache management initiates cache replacement 199 processes. However, if the selected primary lookup tag and primary tag 166 match, it is a tag hit. A tag hit indicates that the data associated with memory address 105 might be available in data block memory 175.

In one example, in the second step secondary tag match 185, the cache management compares the content of secondary tag memory 170, i.e., secondary tag 171, and second portion 130 of cache tag 110. If second portion 130 and secondary tag 171 do not match, it is a tag miss indicating that it is unlikely that the selected cache line contains the data associated with memory address 105 and triggers cache miss 195. If the cache management searched all cache lines 158 without any secondary tag hit, it starts cache replacement 199. However, if not all cache lines 158 are searched, the cache management will repeat the first step of primary tag match 180 with the contents of another cache line 158. If the second portion 130 and secondary tag 171 match, it is a tag hit. A tag hit of primary and secondary tags indicates a cache hit and triggers cache hit 190. In response to cache hit 190 data processing 197 retrieves the data and makes it available. In one example, the cache management performs secondary tag match 185 and data processing 197 in parallel to reduce latency.

Figure 2:
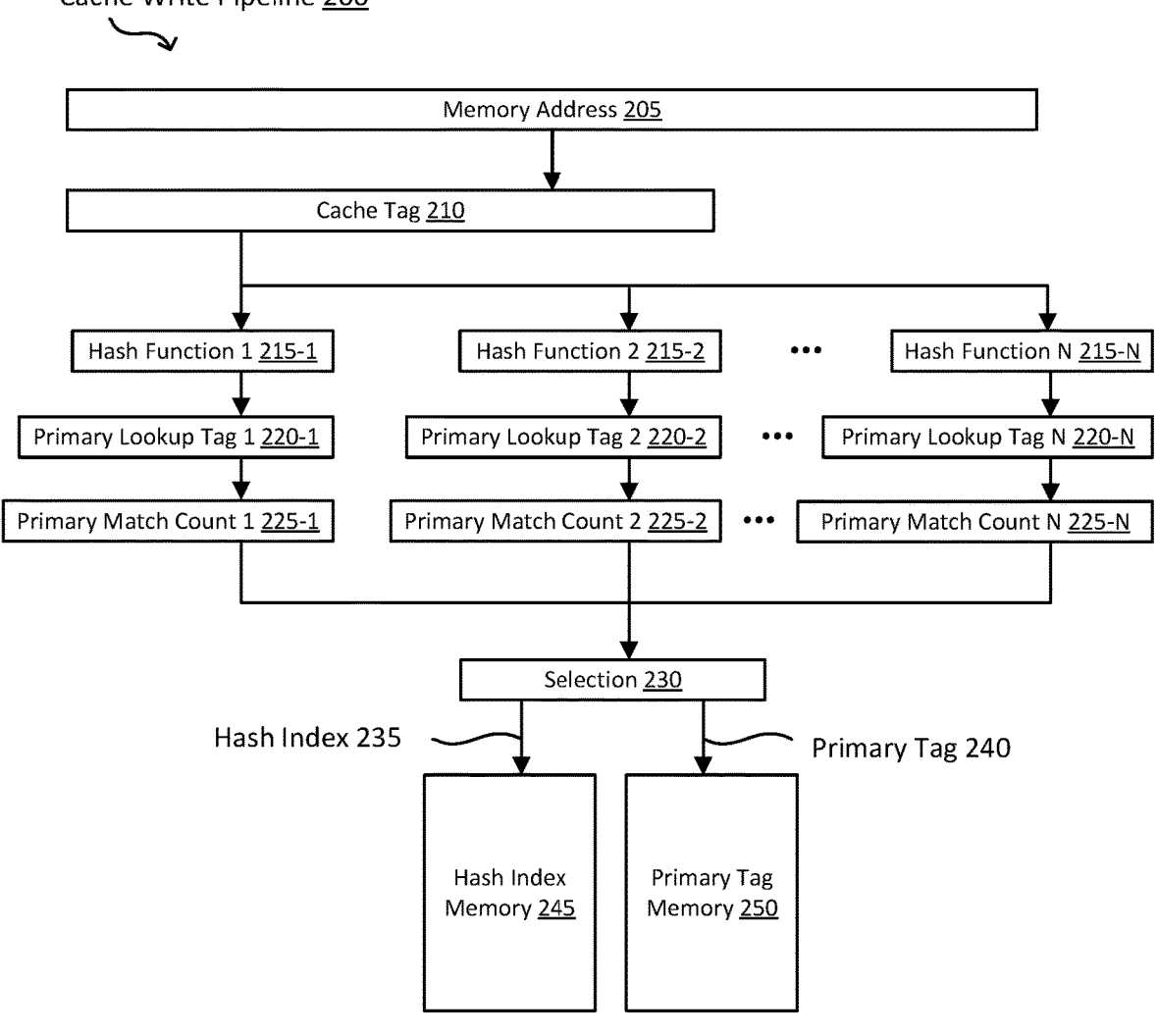
FIG. 2 is a flow diagram of an example of generating and storing the primary tag and the hash index for a cache write pipeline.

FIG. 2 is a flow diagram of an example of generating and storing the primary tag and the hash index for a cache write pipeline 200. In one example, when the processor requests data not available in the cache memory, cache management adds the data to the cache memory. The process of adding the data to the cache herein is called cache write. In one example, when the cache memory is empty, e.g., at the boot, the cache write is called cache fill. Cache write is called cache replacement when the cache memory is full and new data is going to replace some of the existing data in the cache memory.

In one example, cache management receives memory address 205 of the data that is going to be written in the cache memory and extracts cache tag 210 from it. Hash function 1 215-1 receives cache tag 210 and computes primary lookup tag 1 220-1. Similarly, hash function 2 215-2 receives cache tag 210 and computes primary lookup tag 2 220-2. Every hash function receives cache tag 210 and computes a corresponding primary lookup tag. The last hash function, hash function N 215-N also receives cache tag 210 and computes primary lookup tag N 220-N.

In one example, primary match count 225 of cache management compares each primary lookup tag 220 to the contents of primary tag memory 250. For example, primary match count 1 225-1 compares primary lookup tag 1 220-1 to the primary tags in primary tag memory 250. Likewise, primary match count 2 225-2 compares primary lookup tag 2 220-2 to the primary tags in primary tag memory 250. And, primary match count N 225-N compares primary lookup tag N 220-N to the primary tags in primary tag memory 250. It is called a hit when there is a match between primary match count 225 and a primary tag in primary tag memory 250.

In one example, selection 230 chooses one of the primary lookup tags 220. The selected primary lookup tag is primary tag 240 of the memory address 205. Cache management writes primary tag 240 in primary tag memory 250. In addition, cache management writes the hash index 235 in hash index memory 245. Hash index 235 is the index of the hash function used to compute primary tag 240.

In one example, each hash function 215 has an index. For example, the hash index of hash function 1 215-1 is 1, the hash index of hash function 2 215-2 is 2, and the hash index of hash function N 215-N is N.

In one example, hash function 215 uses the first portion of cache tag 210 (for example, first portion 125 in FIG. 1) to compute primary lookup tag 220. In one example, hash function 215 uses all of cache tag 210 to compute primary lookup tag 220.

In one example, selection 230 chooses primary lookup tag 220 with the least number of hits. In one example, if two or more primary lookup tags 220 have the same number of hits and all have the least number of hits, then selection 230 chooses primary lookup tag 220, whose corresponding hash function 215 has the smallest hash index. A hash function is said to be corresponding to a given primary lookup tag 220 if the given primary lookup tag 220 is computed by that hash function. For example, in FIG. 2, hash function 1 215-1 is corresponding to primary lookup tag 1 220-1, hash function 2 215-2 is corresponding to primary lookup tag 2 220-2, and hash function N 215-N is corresponding to primary lookup tag N 220-N.

During the fill step, cache management calculates the primary tag representation and collision rate for each of hash functions 215 and selects the hash function that has the minimum number of collisions. Collision is another term used to describe a match between a primary lookup tag 220 and one or more primary tags stored in the primary tag memory 250.

Figure 3A:
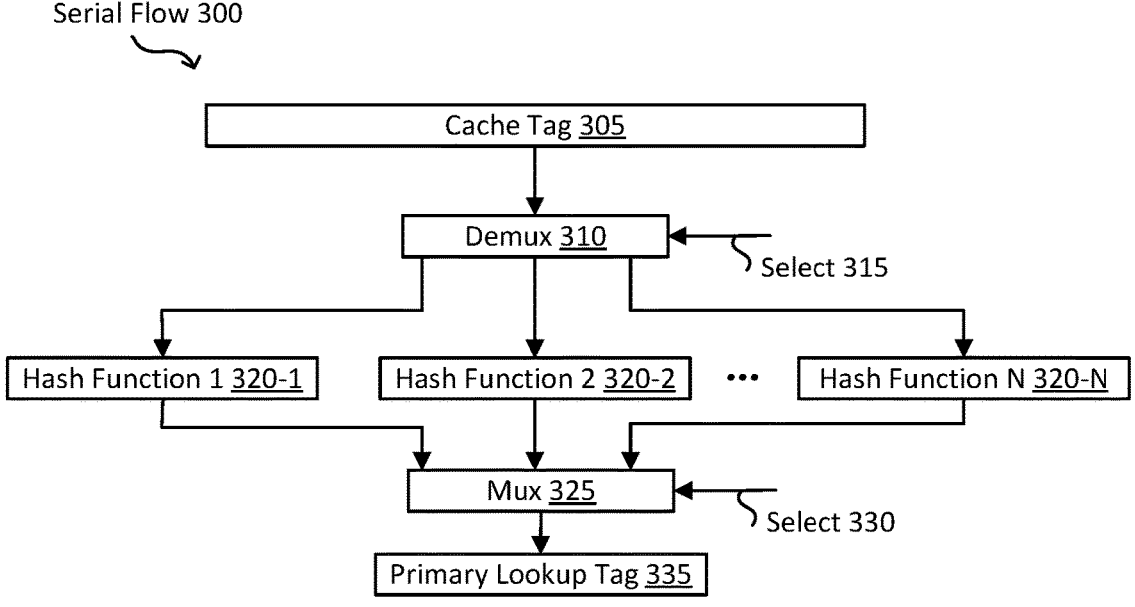
FIG. 3A is a block diagram of an example of a system with a serial flow for computing the primary lookup tags.

FIG. 3A is a block diagram of an example of a system with a serial flow 300 for computing the primary lookup tags. To compute the primary lookup tags serially is to compute them one after the other. For example, cache tag 305 is the input to demux 310. A demux is a device, or circuitry, that connects a single input to one of the multiple available outputs. A selection signal determines to which output the input is connected. For example, select 315 determines cache tag 305 to be available to which hash function 320. A mux is a multiple-input and single-output device or circuitry. A selection signal determines which input is connected to the output. For example, outputs of hash functions 320 are inputs to mux 325, and select 330 chooses the output of one of hash functions 320.

In one example, cache tag 305 is the input to demux 310. Select 315 determines cache tag 305 to be available to which one of hash function 1 320-1, hash function 2 320-2, . . . , or hash function N 320-N. The output of each hash function 320 is an input to mux 325. Select 330 determines the output of which hash function 320 to be primary lookup tag 335.

For example, to serially generate primary lookup tags, select 315 selects hash function 1 320-1 to receive cache tag 305 and computes a primary lookup tag. Then, select 330 selects the output of hash function 1 320-1 to be primary lookup tag 335. In the next iteration, select 315 selects hash function 2 320-2 to receive cache tag 305 and computes a primary lookup tag. Then, select 330 selects the output of hash function 2 320-2 to be primary lookup tag 335. The procedure repeats until select 315 selects hash function N 320-N to receive cache tag 305 and computes a primary lookup tag. Then, select 330 selects the output of hash function N 320-N to be primary lookup tag 335.

In one example, select 315 and select 330 are the same. In another example, select 315 and select 330 are different.

Figure 3B:
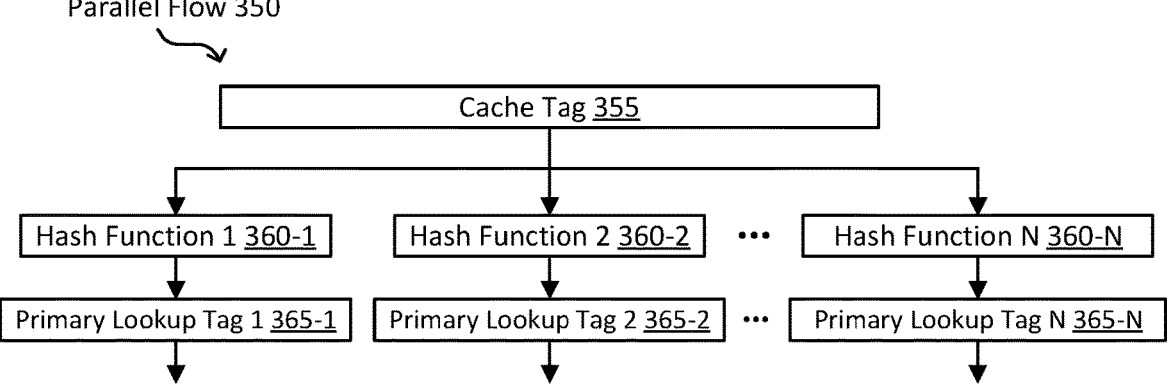
FIG. 3B is a block diagram of an example of a system with a parallel flow for computing the primary lookup tags.

FIG. 3B is a block diagram of an example of a system with a parallel flow 350 for computing primary lookup tags. In one example, hash function 1 360-1, hash function 2 360-2, . . . , and hash function N 360-N receive cache tag 355 simultaneously. Hash function 1 360-1 computes primary lookup tag 1 365-1, hash function 2 360-2 computes primary lookup tag 3 365-2, . . . , and hash function N 360-N computes primary lookup tag N 365-N. All primary lookup tags 365 are computed simultaneously.

Figures 4A, 4B:
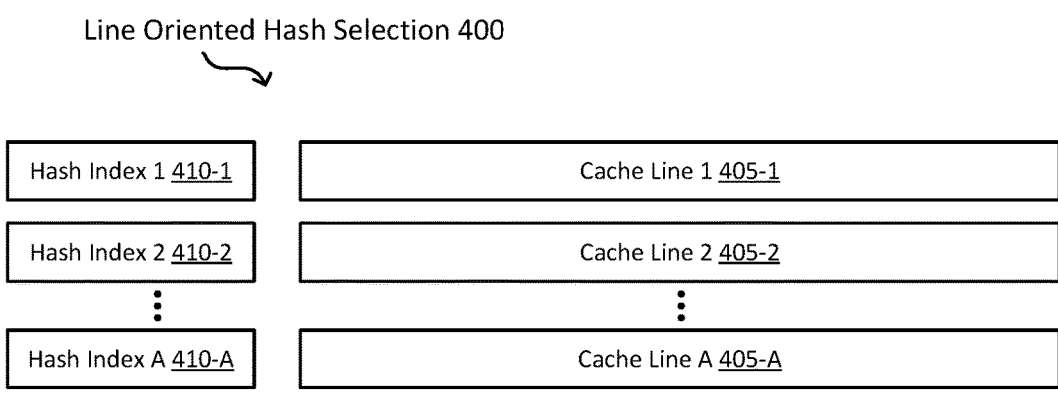
FIG. 4A is a block diagram of an example of a system with a line-oriented hash selection.
FIG. 4B is a block diagram of an example of a system with a set-oriented hash selection.

FIG. 4A is a block diagram of an example of a system with a line-oriented hash selection 400. The cache in the example of FIG. 4A has A cache lines, i.e., cache line 1 405-1, cache line 2 405-2, . . . cache line A 405-A. The primary tag of each cache line is associated with a hash index 410 that could be different from the hash index of the primary tag of another cache line. For example, hash index 1 410-1 determines the hash function used to compute the primary tag of data in cache line 1 405-1. Similarly, hash index 2 410-2 determines the hash function used to compute the primary tag of data in cache line 2 405-2. Finally, hash index A 410-A determines the hash function used to compute the primary tag of data in cache line A 405-A.

FIG. 4B is a block diagram of an example of a system with a set-oriented hash selection 450. The cache in the example of FIG. 4B has K sets, i.e., set 1 455-1 to set K 455-K. Each set has B cache lines. Set 1 455-1 has B cache lines, i.e., cache line 1 460-1, cache line 2 460-2, . . . , cache line B 460-B. A single hash index, hash index 1 465-1, is associated with all the cache lines in set 1 455-1. Similarly, set K 455-K has B cache lines, i.e., cache line 1 480-1, cache line 2 480-2, . . . , cache line B 480-B. A single hash index, hash index K 465-K is associated with all the cache lines in set K 455-K. The primary tags of all cache lines 460 in set 1 455-1 are computed using the hash function determined by hash index 1 465-1. Similarly, the primary tags of all cache lines 480 in set K 455-K are computed using the same hash function determined by hash index K 465-K.

FIG. 5 is a block diagram of an example of a cache subsystem 500. Cache subsystem 500 includes cache management 510 and cache memory 570. Cache subsystem 500 receives memory address 502 and other IO 501 as input and returns cached data 503.

In one example, cache memory 570 includes hash index memory 575, primary tag memory 580, secondary tag memory 585, and data memory 590. Hash index memory 575 stores hash indexes where each hash index is associated with a hash function. In one example, a hash index can uniquely determine a hash function. Primary tag memory 580 stores primary tags. Secondary tag memory 585 stores secondary tags. Data memory 590 stores the data. In one example, hash indices and primary tags are stored in one physical memory. In another example, hash indices and primary tags are stored in physically separate memories.

In one example, hash index memory 575 is a static random access memory (SRAM). In one example, primary tag memory 580 is an SRAM. In one example, secondary tag memory 585 is a dynamic random access memory (DRAM). In one example, data memory 590 is a DRAM. Other memory technologies can be used for implementing hash index memory 575, primary tag memory 580, secondary tag memory 585, and data memory 590.

In one example, cache management 510 performs cache access, cache fill, and cache replacement flows and procedures. Cache management 510 is at least partially implemented in hardware circuitry. Address processing 515 receives and processes memory address 502. For example, address processing 515 separates memory address 502 into components such as cache tag (e.g., cache tag 110 in FIG. 1), index (e.g., index 115 in FIG. 1), and offset (e.g., offset 120 in FIG. 1). In one example, address processing 515 separates cache tag (e.g., cache tag 110 in FIG. 1) into two portions (e.g., first portion 125 and second portion 130 in FIG. 1).

In one example, cache management 510 includes hash bank 525. Hash bank 525 includes circuitry that implements a group of hash functions. In one example, hash bank 525 includes circuitry implementing P hash functions, i.e., hash function 1 530-1, hash function 2 530-2, . . . , hash function P 530-P. In one example, each hash function 530 of hash bank 525 is associated with a hash index. For example, hash function 1 530-1 has hash index 1 533-1, hash function 2 530-2 is associated with hash index 2 533-2, and hash function P 530-P has hash index P 533-P. In one example, hash index 533 is a logical value. In one example, hash index 533 is implemented using registers.

In one example, other IO 501 includes cache access request signal. In response to receiving a cache access signal, controller 523 selects a cache line from cache memory 570. Based on the hash index stored in hash index memory 575 of the selected cache line, controller 523 selects a hash function from the group of hash functions in hash bank 525. The selected hash function computes primary lookup tag 535. In one example, the selected hash function uses memory address 502 to compute primary lookup tag 535. In one example, the selected hash function uses the cache tag generated by address processing 515 to compute primary lookup tag 535. In another example, the selected hash function uses the first portion of the cache tag to compute primary lookup tag 535. In one example, all hash function 530 receive the cache tag and compute and return a primary lookup tag. Based on the hash index stored in hash index memory 575 of the selected cache line, controller 523 selects a computed primary lookup tag to be primary lookup tag 535.

In one example, other IO 501 includes cache replacement request. In one example, in case of a cache miss, when data is not found in the cache, search status 560 generates a cache replacement request. In one example, in response to cache replacement request, primary tag selection 565 selects the primary lookup tag with the least number of collisions with primary tags stored in primary tag memory 580. Cache management 510 writes the selected primary lookup tag in primary tag memory 580 and the corresponding hash index in hash index memory 575. In one example, controller 523 determines the cache line that will be replaced by the new data.

In one example, primary tag match 550 receives primary lookup tag 535 and compares it against the primary tag stored in primary tag memory 580 of the cache line selected by controller 523. In one example, search status 560 includes circuitry to record the status of primary tag match 550. In one example, if primary tag match 550 reports a hit, secondary tag match 555 checks if the second portion of the cache tag matches the secondary tag stored in secondary tag memory 585 of the cache line selected by controller 523. In one example, search status 560 receives and holds hit or miss status of secondary tag match 555.

In one example, the hash functions 530 are independent hash functions. The independence of hash functions can be defined based on whether their outputs are correlated with one another or whether their outputs are statistically independent.

In one example, cache management 510 includes P hash function 530. In one example, cache management 510 uses N hash functions out of P available hash functions, where N is smaller than P, to generate primary lookup tags. In one example, configuration 520 determines the group of N hash functions to compute primary lookup tags. In one example, configuration 520 sets the value of hash indices 533 and determines the priority and order of hash functions 530. In one example, other IO 501 includes signals to configure configuration 520. In one example, configuration 520 is implemented in hardware circuitry.

Figure 6:
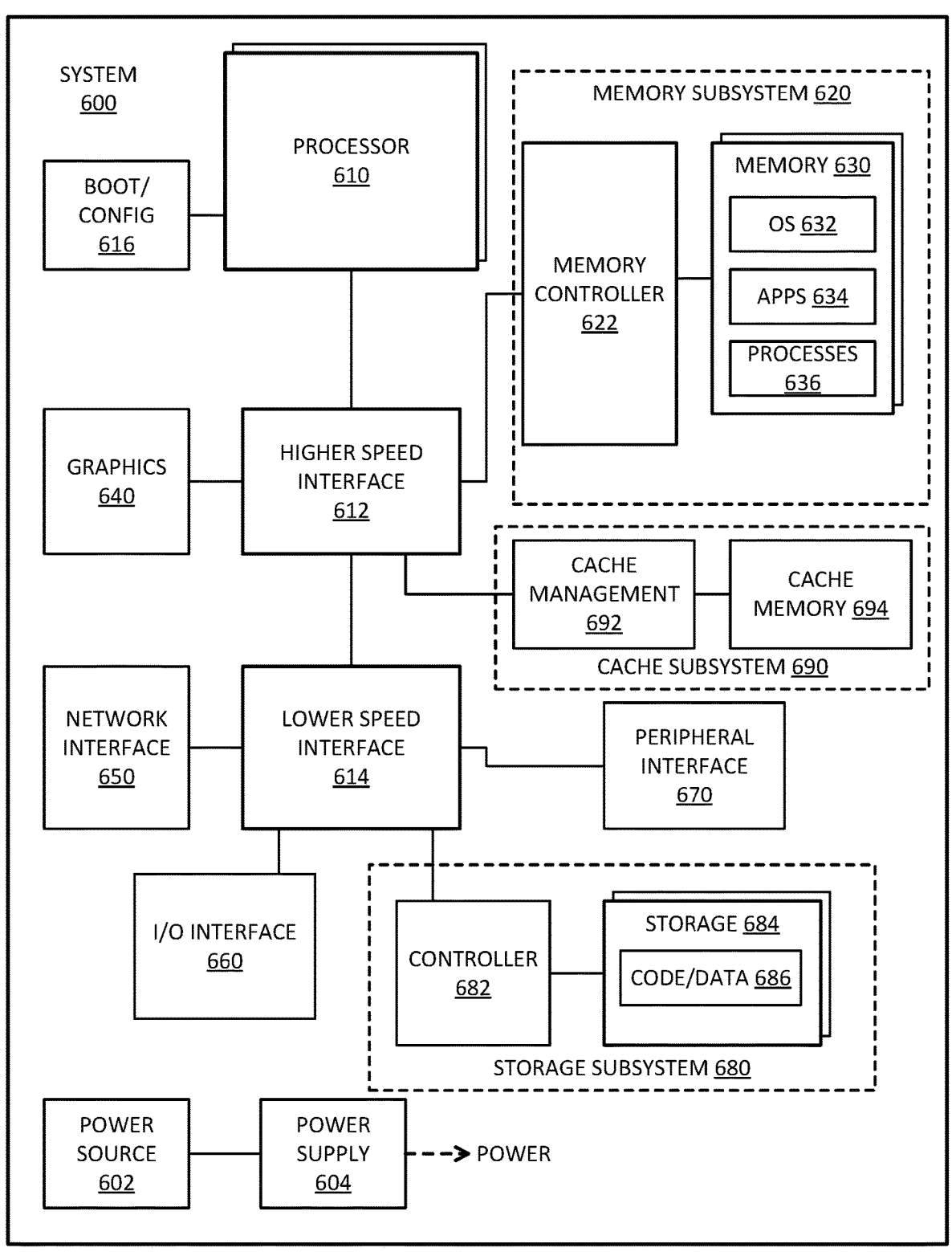
FIG. 6 is a block diagram of an example of a process for a system using cache management with tag size reduction.

FIG. 6 is a block diagram of an example of a computing system that can include a cache subsystem implementing multiple hash techniques for generating primary tags. System 600 represents a computing device in accordance with any example herein and can be a laptop computer, a desktop computer, a tablet computer, a server, a gaming or entertainment control system, an embedded computing device, or other electronic devices.

In one example, system 600 includes cache subsystem 690 to perform procedures for accessing, filling, and replacing the cache. In one example, cache subsystem 690 includes cache management 692 and cache memory 694. Cache management 692 includes a group of hash functions used to generate primary tags for data stored in cache memory 694. The group of hash functions of cache management 692 is also used to generate primary lookup tags when accessing data stored in cache memory 694.

System 600 includes processor 610 can include any type of microprocessor, central processing unit (CPU), graphics processing unit (GPU), processing core, or other processing hardware, or a combination, to provide processing or execution of instructions for system 600. Processor 610 can be a host processor device. Processor 610 controls the overall operation of system 600 and can be or include one or more programmable general-purpose or special-purpose microprocessors, digital signal processors (DSPs), programmable controllers, application-specific integrated circuits (ASICs), programmable logic devices (PLDs), or a combination of such devices.

System 600 includes boot/config 616, which represents storage to store boot code (e.g., basic input/output system (BIOS)), configuration settings, security hardware (e.g., trusted platform module (TPM)), or other system-level hardware that operates outside of a host OS (operating system). Boot/config 616 can include a nonvolatile storage device, such as read-only memory (ROM), flash memory, or other memory devices.

In one example, system 600 includes interface 612 coupled to processor 610, which can represent a higher speed interface or a high throughput interface for system components that need higher bandwidth connections, such as memory subsystem 620 or graphics interface components 640. Interface 612 represents an interface circuit, which can be a standalone component or integrated onto a processor die. Interface 612 can be integrated as a circuit onto the processor die or integrated as a component on a system on a chip. Where present, graphics interface 640 interfaces to graphics components for providing a visual display to a user of system 600. Graphics interface 640 can be a standalone component or integrated onto the processor die or system on a chip. In one example, graphics interface 640 can drive a high definition (HD) display or ultra high definition (UHD) display that provides an output to a user. In one example, the display can include a touchscreen display. In one example, graphics interface 640 generates a display based on data stored in memory 630 or based on operations executed by processor 610, or both.

Memory subsystem 620 represents the main memory of system 600 and provides storage for code to be executed by processor 610 or data values to be used in executing a routine. Memory subsystem 620 can include one or more varieties of random-access memory (RAM) such as DRAM, 3DXP (three-dimensional crosspoint), or other memory devices, or a combination of such devices. Memory 630 stores and hosts, among other things, operating system (OS) 632 to provide a software platform for executing instructions in system 600. Additionally, applications 634 can execute on the software platform of OS 632 from memory 630. Applications 634 represent programs with their own operational logic to execute one or more functions. Processes 636 represent agents or routines that provide auxiliary functions to OS 632 or one or more applications 634 or a combination. OS 632, applications 634, and processes 636 provide software logic to provide functions for system 600. In one example, memory subsystem 620 includes memory controller 622, which is a memory controller to generate and issue commands to memory 630. It will be understood that memory controller 622 could be a physical part of processor 610 or a physical part of interface 612. For example, memory controller 622 can be an integrated memory controller, integrated onto a circuit with processor 610, such as integrated onto the processor die or a system on a chip.

While not explicitly illustrated, it will be understood that system 600 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or other buses, or a combination.

In one example, system 600 includes interface 614, which can be coupled to interface 612. Interface 614 can be a lower speed interface than interface 612. In one example, interface 614 represents an interface circuit, which can include standalone components and integrated circuitry. In one example, multiple user interface components, peripheral components, or both are coupled to interface 614. Network interface 650 provides system 600 the ability to communicate with remote devices (e.g., servers or other computing devices) over one or more networks. Network interface 650 can include an Ethernet adapter, wireless interconnection components, cellular network interconnection components, USB (universal serial bus), or other wired or wireless standards-based or proprietary interfaces. Network interface 650 can exchange data with a remote device, which can include sending data stored in memory or receiving data to be stored in memory.

In one example, system 600 includes one or more input/output (I/O) interface(s) 660. I/O interface 660 can include one or more interface components through which a user interacts with system 600 (e.g., audio, alphanumeric, tactile/touch, or other interfacings). Peripheral interface 670 can include any hardware interface not specifically mentioned above. Peripherals refer generally to devices that connect dependently to system 600. A dependent connection is one where system 600 provides the software platform or hardware platform or both on which operation executes and with which a user interacts.

In one example, system 600 includes storage subsystem 680 to store data in a nonvolatile manner. In one example, in certain system implementations, at least certain components of storage 680 can overlap with components of memory subsystem 620. Storage subsystem 680 includes storage device(s) 684, which can be or include any conventional medium for storing large amounts of data in a nonvolatile manner, such as one or more magnetic, solid state, NAND, 3DXP, or optical based disks, or a combination. Storage 684 holds code or instructions and data 686 in a persistent state (i.e., the value is retained despite interruption of power to system 600). Storage 684 can be generically considered to be a "memory," although memory 630 is typically the executing or operating memory to provide instructions to processor 610. Whereas storage 684 is nonvolatile, memory 630 can include volatile memory (i.e., the value or state of the data is indeterminate if power is interrupted to system 600). In one example, storage subsystem 680 includes controller 682 to interface with storage 684. In one example, controller 682 is a physical part of interface 614 or processor 610 or can include circuits or logic in both processor 610 and interface 614.

Power source 602 provides power to the components of system 600. More specifically, power source 602 typically interfaces to one or multiple power supplies 604 in system 600 to provide power to the components of system 600. In one example, power supply 604 includes an AC to DC (alternating current to direct current) adapter to plug into a wall outlet. Such AC power can be renewable energy (e.g., solar power) power source 602. In one example, power source 602 includes a DC power source, such as an external AC to DC converter. In one example, power source 602 or power supply 604 includes wireless charging hardware to charge via proximity to a charging field. In one example, power source 602 can include an internal battery or fuel cell source.

In Example 1, an apparatus for cache management, includes a primary tag memory to store primary tags computed from a first portion of cache tags, where the first portion is less than all bits of a cache tag; and circuitry coupled to the primary tag memory to receive a cache tag for data to be read from a cache memory, select a hash function from a group of hash functions, compute a primary lookup tag from the selected hash function and the cache tag, and compare the primary lookup tag to contents of the primary tag memory to determine if there is a hit.

In Example 2, the apparatus for cache management of example 1, wherein the circuitry is to select the primary lookup tag with a least number of hits.

In Example 3, the apparatus for cache management of any preceding example includes a hash index memory wherein each hash function of the group of hash functions is to be associated with a hash index, and in response to a replacement request, the circuitry is to select a first hash function of the group of hash functions used to compute the primary lookup tag with the least number of hits with the contents of the primary tag memory, write the primary lookup tag in the primary tag memory, and write the hash index associated with the first hash function in the hash index memory.

In Example 4, the apparatus for cache management of any preceding example wherein the circuitry is to perform a first tag match against a primary tag stored in the primary tag memory; and, if a match is found, perform a second tag match against a second portion of the cache tag stored in a secondary tag memory.

In Example 5, the apparatus for cache management of any preceding example, wherein the primary tag memory is a static random access memory (SRAM).

In Example 6, the apparatus for cache management of any preceding example includes a secondary tag memory to store a second portion of the cache tag wherein the secondary tag memory is a dynamic random access memory (DRAM).

In Example 7, the apparatus for cache management of any preceding example, wherein the group of hash functions comprises independent hash functions.

In Example 8, the apparatus for cache management of any preceding example, wherein a number of hash functions in the group of hash functions is smaller than a number of available hash functions, and the circuitry includes a configuration circuitry to determine which hash functions to include in the group of hash functions.

In Example 9, a compute system includes a processor; a memory; a cache memory; and an apparatus for cache management that includes a primary tag memory to store a first portion of cache tags, where the first portion is less than all bits of a cache tag; and circuitry coupled to the primary tag memory to receive a cache tag for data to be read from a cache memory, select a hash function from a group of hash functions, compute a primary lookup tag from the selected hash function and the cache tag, and compare the primary lookup tag to contents of the primary tag memory to determine if there is a hit.

In Example 10, the compute system of example 9, wherein the circuitry of the apparatus for cache management is to select the primary lookup tag with a least number of hits.

In Example 11, the apparatus for cache management of any preceding example, wherein the apparatus for cache management comprising a hash index memory wherein each hash function of the group of hash functions is to be associated with a hash index, and in response to a replacement request, the circuitry is to select a first hash function of the group of hash functions used to compute the primary lookup tag with the least number of hits with the contents of the primary tag memory, write the primary lookup tag in the primary tag memory, and write the hash index associated with the first hash function in the hash index memory.

In Example 12, the compute system of any preceding example, wherein the circuitry of the apparatus for cache management is to perform a first tag match for an access request against the first portion of the cache tag stored in the primary tag memory; and, if a match is found, perform a second tag match for the access request against a second portion of the cache tag stored in a secondary tag memory.

In Example 13, the compute system of any preceding example, wherein the group of hash functions of the apparatus for cache management is to include independent hash functions.

In Example 14, the compute system of any preceding example, wherein a number of hash functions in the group of hash functions in the apparatus for cache management is smaller than a number of available hash functions, and the circuitry of the apparatus for cache management includes a configuration circuitry to determine which hash functions to include in the group of hash functions.

In Example 15, a method for cache management includes receiving a cache tag for data to be read from a cache memory; selecting a hash function from a group of hash functions; computing a primary lookup tag from the selected hash function and the cache tag; comparing the primary lookup tag to contents of a primary tag memory; and determining there is a cache hit when primary lookup tag matching the contents of the primary tag memory and a cache miss when primary lookup tag not matching the contents of the primary tag memory.

In Example 16, a method for cache management of example 15 includes selecting the primary lookup tag with a least number of hits.

In Example 17, a method for cache management of any preceding example includes associating each hash function of the group of hash functions with a hash index; selecting a first hash function of the group of hash functions used to compute the primary lookup tag with the least number of hits with the contents of the primary tag memory; writing the primary lookup tag in the primary tag memory; and writing the hash index associated with the first hash function in a hash index memory.

In Example 18, a method for cache management of any preceding example includes performing a first tag match for an access request against a first portion of the cache tag stored in a primary tag memory; and, if a match is found, performing a second tag match for the access request against a second portion of the cache tag stored in a secondary tag memory.

In Example 19, a method for cache management of any preceding example, wherein the group of hash functions includes independent hash functions.

In Example 20, a method for cache management of any preceding example includes configuring the group of hash functions from available hash function, wherein a number of hash functions in the group of hash functions is smaller than a number of available hash functions.

Flow diagrams, as illustrated herein, provide examples of sequences of various process actions. The flow diagrams can indicate operations to be executed by a software or firmware routine, as well as physical operations. A flow diagram can illustrate an example of the implementation of states of a finite state machine (FSM), which can be implemented in hardware and/or software. Although shown in a particular sequence or order, the order of the actions can be modified unless otherwise specified. Thus, the illustrated diagrams should be understood only as examples, and the process can be performed in a different order, and some actions can be performed in parallel. Additionally, one or more actions can be omitted; thus, not all implementations will perform all actions.

To the extent various operations or functions are described herein, they can be described or defined as software code, instructions, configuration, and/or data. The content can be directly executable ("object" or "executable" form), source code, or difference code ("delta" or "patch" code). The software content of what is described herein can be provided via an article of manufacture with the content stored thereon or via a method of operating a communication interface to send data via the communication interface. A machine-readable storage medium can cause a machine to perform the functions or operations described and includes any mechanism that stores information in a form accessible by a machine (e.g., computing device, electronic system, etc.), such as recordable/non-recordable media (e.g., read-only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application-specific hardware, application-specific integrated circuits (ASICs), digital signal processors (DSPs), etc.), embedded controllers, hardwired circuitry, etc.

Besides what is described herein, various modifications can be made to what is disclosed and implementations of the invention without departing from their scope. Therefore, the illustrations and examples herein should be construed in an illustrative and not a restrictive sense. The scope of the invention should be measured solely by reference to the claims that follow.

What is claimed is:

1. An apparatus for cache management, comprising:
a primary tag memory to store primary tags computed from first portions of cache tags, where a cache tag has a first portion and a second portion with more bits than the first portion, the cache tag to identify data in a cache memory separate from the primary tag memory;
a secondary tag memory separate from the primary tag memory and the cache memory, to store the second portions of the cache tags as secondary tags; and
circuitry coupled to the primary tag memory to:
receive a selected cache tag for data to be read from the cache memory,
compute a primary lookup tag from the first portion of the selected cache tag,
compare the primary lookup tag to contents of the primary tag memory, and
if there is a hit on the primary tag memory, compare the second portion of the selected cache tag to contents of the secondary tag memory to determine if there is a cache hit.

2. The apparatus for cache management of claim 1, wherein the circuitry is to
compute multiple hash functions with different hashing algorithms to generate multiple primary lookup tags for the selected cache tag; and
select the primary lookup tag with a least number of hits in the primary tag memory.

3. The apparatus for cache management of claim 2, comprising a hash index memory wherein:
each hash function of the multiple hash functions is to be associated with a hash index, and
in response to a replacement request, the circuitry is to:
select a first hash function of the multiple hash functions used to compute the primary lookup tag with the least number of hits with the contents of the primary tag memory,
write the primary lookup tag in the primary tag memory, and
write the hash index associated with the first hash function in the hash index memory.

4. The apparatus for cache management of claim 1, wherein the primary tag memory is a static random access memory (SRAM).

5. The apparatus for cache management of claim 4, wherein the secondary tag memory is a dynamic random access memory (DRAM).

6. The apparatus for cache management of claim 2, wherein the circuitry is to select a subset of available hashing algorithms to compute the multiple hash functions.

7. A compute system, comprising:

a processor;

a memory;

a cache memory; and an apparatus for cache management comprising:

a primary tag memory to store primary tags computed from first portions of cache tags, where a cache tag has a first portion and a second portion with more bits than the first portion, the cache tag to identify data in a cache memory separate from the primary tag memory;

a secondary tag memory separate from the primary tag memory and the cache memory, to store the second portions of the cache tags as secondary tags; and circuitry coupled to the primary tag memory to:

receive a selected cache tag for data to be read from the cache memory, compute a primary lookup tag from the first portion of the selected cache tag, compare the primary lookup tag to contents of the primary tag memory, and if there is a hit on the primary tag memory, compare the second portion of the selected cache tag to contents of the secondary tag memory to determine if there is a cache hit.

8. The compute system of claim 7, wherein the circuitry of the apparatus for cache management is to compute multiple hash functions with different hashing algorithms to generate multiple primary lookup tags for the selected cache tag; and select the primary lookup tag with a least number of hits in the primary tag memory.

9. The compute system of claim 8, wherein the apparatus for cache management comprising a hash index memory wherein:

each hash function of the multiple hash functions is to be associated with a hash index, and in response to a replacement request, the circuitry is to:

select a first hash function of the multiple hash functions used to compute the primary lookup tag with the least number of hits with the contents of the primary tag memory, write the primary lookup tag in the primary tag memory, and write the hash index associated with the first hash function in the hash index memory.

10. The compute system of claim 8, wherein the primary tag memory is a static random access memory (SRAM).

11. The compute system of claim 10, wherein the secondary tag memory is a dynamic random access memory (DRAM).

12. The compute system of claim 8, wherein the circuitry of the apparatus for cache management is to select a subset of available hashing algorithms to compute the multiple hash functions.

13. A method for cache management, comprising:

storing primary tags computed from first portions of cache tags in a primary tag memory, where a cache tag has a first portion and a second portion with more bits than the first portion, the cache tag to identify data in a cache memory;

storing the second portions of the cache tags as secondary tags in a secondary tag memory;

receiving a selected cache tag for data to be read from the cache memory;

computing a primary lookup tag from the first portion of the selected cache tag;

comparing the primary lookup tag to contents of the primary tag memory; and if there is a hit on the primary tag memory, comparing the second portion of the selected cache tag to contents of the secondary tag memory to determine if there is a cache hit.

14. The method for cache management of claim 13, comprising computing multiple hash functions with different hashing algorithms to generate multiple primary lookup tags for the selected cache tag; and selecting the primary lookup tag with a least number of hits in the primary tag memory.

15. The method for cache management of claim 14, comprising:

associating each hash function of the multiple hash functions with a hash index;

selecting a first hash function of the multiple hash functions used to compute the primary lookup tag with the least number of hits with the contents of the primary tag memory;

writing the primary lookup tag in the primary tag memory; and writing the hash index associated with the first hash function in a hash index memory.

16. The method for cache management of claim 14, comprising:

selecting a subset of available hashing algorithms to compute the multiple hash functions.

17. The method for cache management of claim 13, wherein the primary tag memory is a static random access memory (SRAM).

18. The method for cache management of claim 17, wherein the secondary tag memory is a dynamic random access memory (DRAM).

\* \* \* \* \*